United States Patent
Motzko (10) Patent No.: US 11,429,547 B2
(45) Date of Patent: Aug. 30, 2022

(54) APPARATUS AND METHOD FOR THE BUFFERED TRANSMISSION OF DATA BY A CONTROLLER TO REDUCE A LOAD ON A CENTRAL PROCESSING UNIT

(71) Applicant: WAGO Verwaltungsgesellschaft mbH, Minden (DE)

(72) Inventor: Andre Motzko, Petershagen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/101,953

(22) Filed: Nov. 23, 2020

(65) Prior Publication Data
US 2021/0157754 A1 May 27, 2021

(30) Foreign Application Priority Data
Nov. 22, 2019 (DE) ............... 10 2019 131 603.0

(51) Int. Cl.
| G06F 13/28 | (2006.01) |
| G06F 13/12 | (2006.01) |
| H04L 69/22 | (2022.01) |

(52) U.S. Cl.
CPC ............ G06F 13/28 (2013.01); G06F 13/122 (2013.01); H04L 69/22 (2013.01)

(58) Field of Classification Search
CPC ...................................................... G06F 13/28
USPC ........................................................ 710/22
See application file for complete search history.

(56) References Cited

U.S. PATENT DOCUMENTS

| 5,796,721 | A | * | 8/1998 | Gretta, Jr. | H04L 43/028 370/245 |
| 5,850,523 | A | * | 12/1998 | Gretta, Jr. | H04L 43/028 709/224 |
| 6,041,328 | A | * | 3/2000 | Yu | H04L 49/90 |
| 6,339,809 | B1 | * | 1/2002 | Gama | G06F 5/00 711/5 |
| 6,678,825 | B1 | * | 1/2004 | Ellison | G06F 21/74 710/200 |
| 7,447,805 | B2 | * | 11/2008 | Braun | G06F 12/0215 710/1 |
| 8,176,291 | B1 | * | 5/2012 | Solt | G06F 12/023 711/170 |
| 8,676,357 | B2 | * | 3/2014 | Boercsoek | G05B 19/4185 700/78 |
| 2001/0056540 | A1 | * | 12/2001 | Ober | G06F 21/74 713/193 |
| 2003/0074513 | A1 | * | 4/2003 | Grouzdev | G06F 13/102 710/306 |

(Continued)

*Primary Examiner* — Titus Wong
(74) *Attorney, Agent, or Firm* — Muncy, Geissler, Olds & Lowe, P.C.

(57) ABSTRACT

An apparatus for the buffered transmission of data and a corresponding method are shown. The apparatus has a central processing unit, multiple first buffers, one or multiple second buffers and a controller configured to ascertain, in response to a first signal, which initiates a transmission of first data from the first buffers to the second buffers based on descriptor list entries, to block the ascertained first buffer for external access, to store an address of the ascertained first buffer in a parameter memory of the controller, to copy the first data from the ascertained first buffer to the second buffer, and to mark the first data as valid or invalid after the copying thereof.

13 Claims, 6 Drawing Sheets

(56) References Cited

U.S. PATENT DOCUMENTS

| | | | |
|---|---|---|---|
| 2003/0163607 A1* | 8/2003 | Lee | G06F 5/06 |
| | | | 710/1 |
| 2004/0153619 A1* | 8/2004 | Geens | G06F 12/0623 |
| | | | 711/170 |
| 2005/0223179 A1* | 10/2005 | Perego | G11C 7/10 |
| | | | 711/154 |
| 2006/0229737 A1* | 10/2006 | Esch | H04L 12/66 |
| | | | 700/1 |
| 2007/0073923 A1* | 3/2007 | Vemula | G06F 13/28 |
| | | | 710/22 |
| 2007/0244571 A1* | 10/2007 | Wilson | G06F 9/542 |
| | | | 700/11 |
| 2010/0284485 A1* | 11/2010 | Calvin | H03K 11/00 |
| | | | 375/272 |
| 2010/0305720 A1* | 12/2010 | Doll | G05B 19/042 |
| | | | 700/86 |
| 2012/0144090 A1* | 6/2012 | Song | G06F 3/0656 |
| | | | 711/102 |
| 2014/0122820 A1* | 5/2014 | Park | G06F 12/145 |
| | | | 711/163 |
| 2014/0173236 A1* | 6/2014 | Kegel | G06F 12/1441 |
| | | | 711/163 |

* cited by examiner

APPARATUS AND METHOD FOR THE BUFFERED TRANSMISSION OF DATA BY A CONTROLLER TO REDUCE A LOAD ON A CENTRAL PROCESSING UNIT

This nonprovisional application claims priority under 35 U.S.C. § 119(a) to German Patent Application No. 10 2019 131 603.0, which was filed in Germany on Nov. 22, 2019, and which is herein incorporated by reference.

BACKGROUND OF THE INVENTION

Field of the Invention

The present invention relates to an apparatus and a method for the buffered transmission of data. In particular, the present invention relates to a buffered transmission of data from a field bus to a local bus of a modular field bus node and vice versa.

Description of the Background Art

The transmission of data from a field bus to a local bus of a modular field bus node and vice versa may take place via a head station of the modular field bus node. The head station may comprise, for example, a field bus interface and a local bus interface as well as a central processing unit, which coordinates or at least monitors the data transmission between the buses.

SUMMARY OF THE INVENTION

Within the scope of the invention, the load on the central processing unit, which arises due to the data transmission between the buses, may be avoided or at least reduced in that the validity check and the addressing of the data are not carried out by the central processing unit but by a controller provided specifically for this task.

An apparatus according to the invention comprises a central processing unit, multiple first buffers, one or multiple second buffers and a controller, the controller being configured, in response to a first signal, which initiates a transmission of first data from the first buffers to the one or a second buffer, to ascertain a first buffer, based on descriptor list entries, to block the ascertained first buffer for external access, to store an address of the ascertained first buffer in a parameter memory of the controller, to copy the first data from the ascertained first buffer to a second buffer, and to mark the first data as valid or invalid after the copying thereof.

The term "central processing unit," can be understood to be, for example, an electronic circuit, which is configured to process data based on a command sequence. In addition, the term "controller," can be understood to be, for example, a direct memory access controller ("DMA," "EDMA," etc.). In addition, the term "buffer," can be understood to be, for example, a data area for temporarily storing data (in an electronic memory). Moreover, the term "descriptor list," can be understood to be, for example, data, from which it may be inferred which data is located in which buffer. Furthermore, the term "address," is to be broadly understood and is to comprise any type of unique identification, such as buffer numbers.

The first ascertained buffer may be the one which contains the most up-to-date valid data.

The controller may be configured to temporarily store one or multiple descriptor list entries in a memory prior to the blocking of the ascertained first buffer and to ascertain the first buffer based on the temporarily stored descriptor list entry/entries.

The controller may be configured to prepend a message header to the copied first data or to append the message header to the copied first data.

The controller may be configured, in response to a second signal, which initiates a transmission of second data from the second or a second buffer to the first buffers, to copy the second data from the second buffer to a first buffer, to check the second data, after the copying, to see whether the second data is marked valid or invalid on the sender side, and to update one or multiple descriptor list entries, from which it may be inferred which first buffer contains the most up-to-date valid data.

The controller may be configured to overwrite invalid and/or outdated data in the first buffer upon copying the second data.

The controller may be designed as a direct memory access (DMA) controller or an enhanced direct memory access (EDMA) controller.

A method according to the invention comprises a receipt by a controller of a first signal, which initiates a transmission of first data from first buffers to second buffers, an ascertainment, by the controller, of the first buffer, based on descriptor list entries, a blocking, by the controller, of the ascertained buffer for external access, a storage, by the controller, of an address of the ascertained first buffer in a parameter memory of the controller, a copying, by the controller, of the first data from the ascertained first buffer to the second buffer, and a marking of the first data copied to the second buffer as valid or invalid.

The method may further comprise a receipt, by the controller, of a second signal, which initiates a transmission of second data from the second buffers to the first buffers, a copying, by the controller, of the second data from a second buffer to a first buffer, a checking, by the controller, of whether the second data is marked as valid or invalid on the transmitter side, and a generation of one or multiple descriptor list entries, from which it may be inferred which first buffer contains the most up-to-date valid data.

The copying of the data may be used to transfer (data) between a field bus and a local bus.

The term "local bus," can be understood to be, for example, a bus via which I/O modules connected in series to a head station are connected (directly) to each other or to the head station. Moreover, the term "head station," as used within the scope of the present description, can be understood to be a component of a modular field bus node, whose task is to make the data and/or the services of the I/O modules connected in series to the head station available to additional field bus users (such as a higher-level control unit) via a bus interface and a field bus connected to the bus interface.

In addition, the term "I/O module," can be understood to be, for example, a device connectable in series to a further I/O module or a head station or connected in series during operation, which connects one or multiple field devices to the head station and possibly to a higher-level control unit (via the head station). In this context, the term "field device," as used within the scope of the present description, can be understood to be, for example, sensors and/or actuators connected (via signals) to the I/O module (e.g. connected at the I/O module).

It is understood that the steps carried out by the apparatus may be understood as possible steps of the corresponding method, which may be implemented using the apparatus, and vice versa.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5b shows further possible modifications of the example illustrated in FIG. 5a.

DETAILED DESCRIPTION

Figure 1:
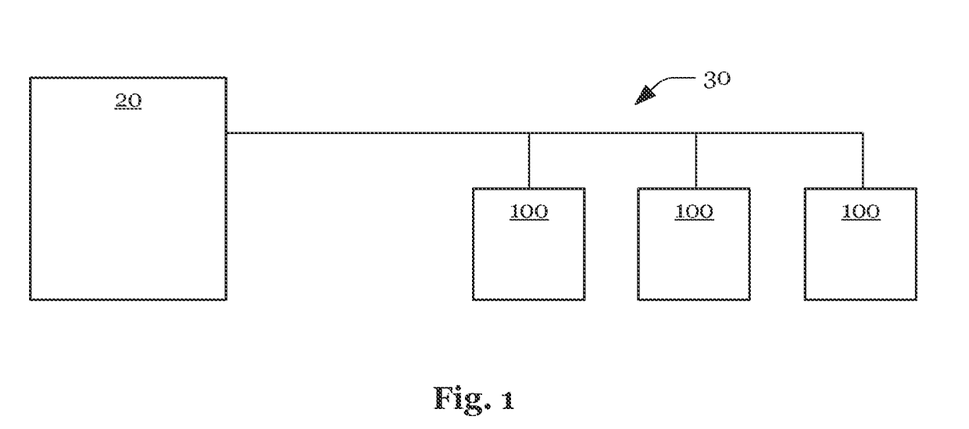
FIG. 1 shows a field bus system.

FIG. 1 shows a block diagram of a field bus system 10. Field bus system 10 comprises a higher-level control unit 20, to which a large number of modular field bus nodes 100 are connected via a field bus 30. Higher-level control unit 20 may be used to monitor as well as control a system (not illustrated), which is controlled by field bus system 10.

If higher-level control unit 20 monitors a system, higher-level control unit 20 may cyclically or acyclically receive input process data from field bus nodes 100, which describes the status of the system and generates an error signal or an alarm signal if the status of the system (substantially) deviates from a desired/permitted status or status range. If higher-level control unit 20 (not only monitors but also) controls the system, higher-level control unit 20 may cyclically or acyclically receive input process data from field bus nodes 100 and ascertain output process data transmitted to field bus nodes 100, taking into account the input process data.

Figure 2:
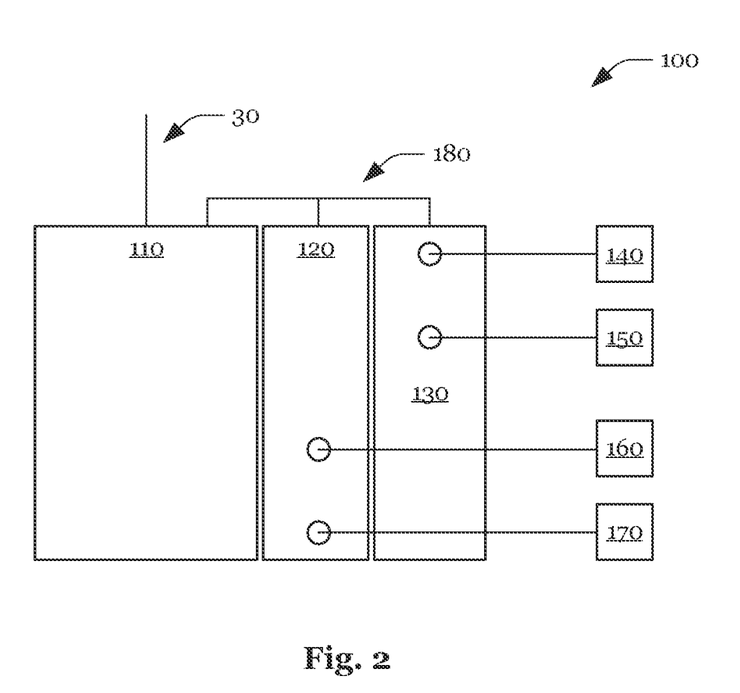
FIG. 2 shows a modular field bus node of the field bus system illustrated in FIG. 1 and field bus devices connected to the field bus node.

FIG. 2 shows an example of modular field bus nodes 100, made up of a head station 110 and two input/output modules 120, 130 (I/O modules) connected in series to head station 110, to which field devices 140, 150, 160, 170 and actuators are connected. During operation, I/O modules 120, 130 read in sensor signals via the inputs and generate input process data from the sensor signals, which is transmitted to head station 110 via local bus 180. Head station 110 may process the input process data locally and/or forward it (possibly in modified form) to higher-level control unit 20. Higher-level control unit 20 (or head station 110 in the case of local processing) may then generate output process data, taking the input process data into account.

The output process data generated by higher-level control unit 20 may then be transmitted to (the same) or (another) head station 110 via field bus 30. The output process data transmitted to head station 110 (or generated by head station 110) is then forwarded/transmitted to I/O modules 120, 130 (possibly in modified form). I/O modules 120, 130 receive the output process data and output control signals corresponding to the output process data at the outputs to which the actuators are connected. The communication of data between the components of field bus system 10 and the mapping of the sensor signals to input process data and the mapping of the control data to output process data may be adapted to different use scenarios by a configuration of field bus nodes 100.

Figure 3:
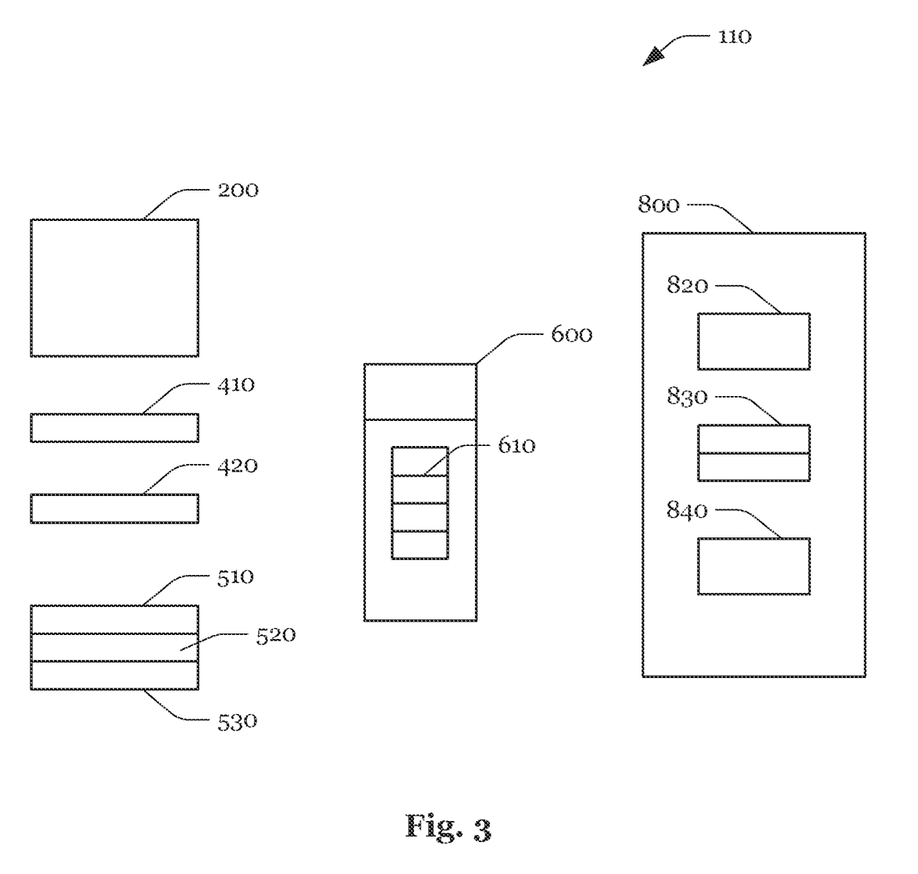
FIG. 3 shows a block diagram of an apparatus according to the invention, which is designed, for example, as the head station of the modular field bus node illustrated in FIG. 2.

FIG. 3 shows a block diagram, which schematically illustrates a possible design of head station 110. Head station 110 comprises a central processing unit 200, three first buffers 510, 520, 530, a second transmit buffer 820, which may be designed, for example, as a "2-buffer FIFO," and a controller 600. To start a transmission of data via local bus 180, bus interface 800 transmits a trigger signal to controller 600. In response to the trigger signal, controller 600 ascertains the first buffer 520 which contains the most recent valid date, based on entries in a descriptor list 420, and blocks this first buffer 520 for external access, in that it writes, for example, the buffer number to a buffer lock register 410.

Controller 600 also stores the address of ascertained first buffer 520 in a parameter memory 610 of controller 600, copies the first data from ascertained first puffer 520 to second transmit buffer 820 and, after copying the first data, marks it as valid or invalid by writing, for example, a "valid" bit to a register 830 of bus interface 800. If a use of apparatus 110 is provided in a scenario, in which a bidirectional communication is to be facilitated, bus interface 800 may include a receive buffer 840 (which may be designed as a single buffer, "dual FIFO," "triple buffer," etc.) in addition to the transmit buffer 820 (which may also be designed as a single buffer, "dual FIFO," "triple buffer," etc.).

Figure 4A:
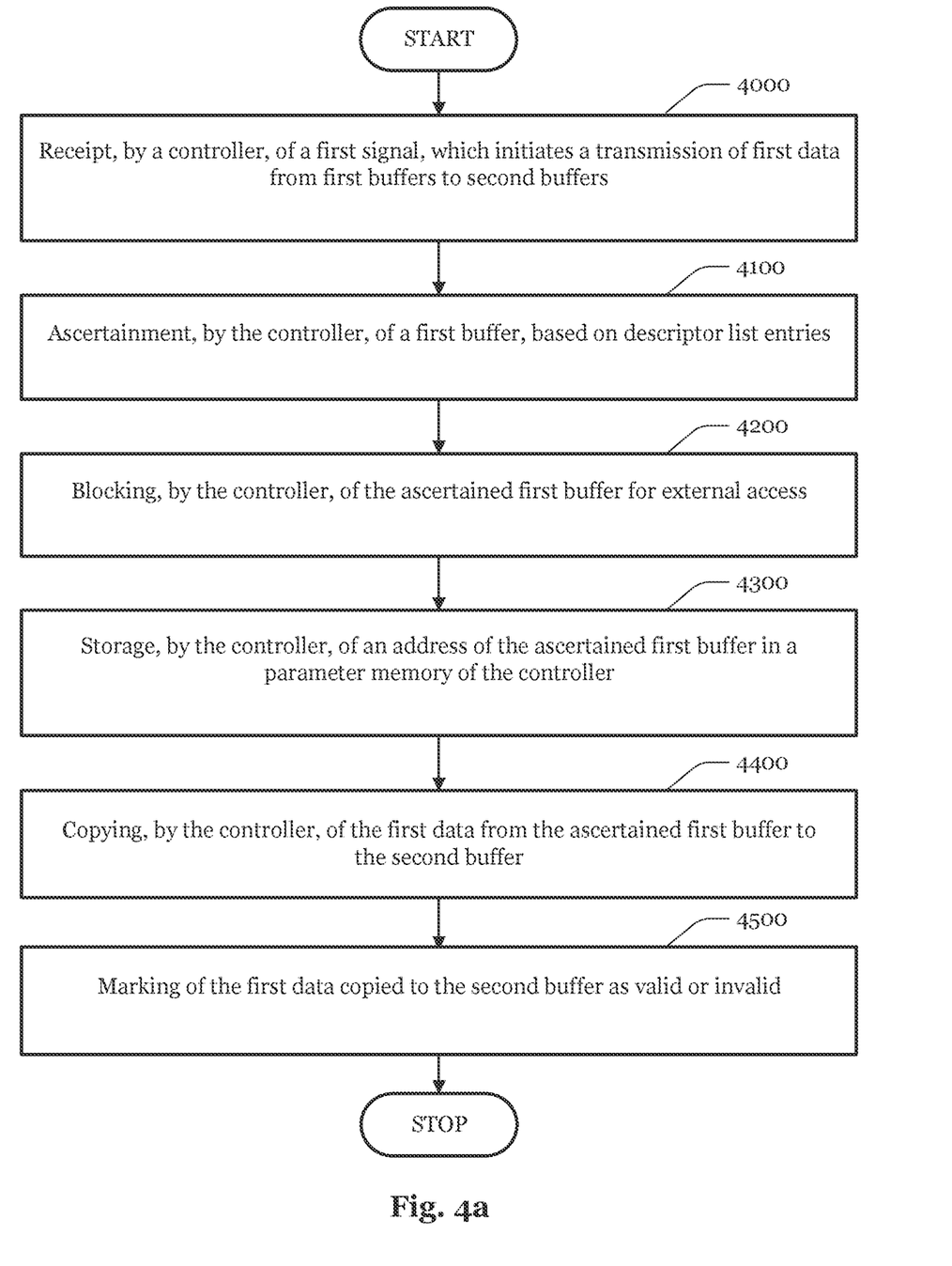
FIG. 4a shows a flowchart, which illustrates the use of apparatuses according to the invention.

FIG. 4a shows the steps of the data transmission in the example illustrated in FIG. 3 in a flowchart. The data transmission begins with step 4000, in which a first signal is received by controller 600, which initiates a transmission of first data from first buffers 510, 520, 530 to transmit buffer 820. In step 4100, first buffer 520 is ascertained by controller 600, based on the entries in descriptor list 420. In step 4200, ascertained first buffer 520 is blocked by controller 600 for external access, in that, for example, the buffer number is written to the "buffer lock register." In step 4300, the address of ascertained first buffer 520 is stored in parameter memory 610 of controller 600. In step 4400, the first data is then copied from ascertained first buffer 520 to transmit buffer 820, and in step 4500, the first data copied to second buffer 820 is marked as valid or invalid.

Figure 4B:
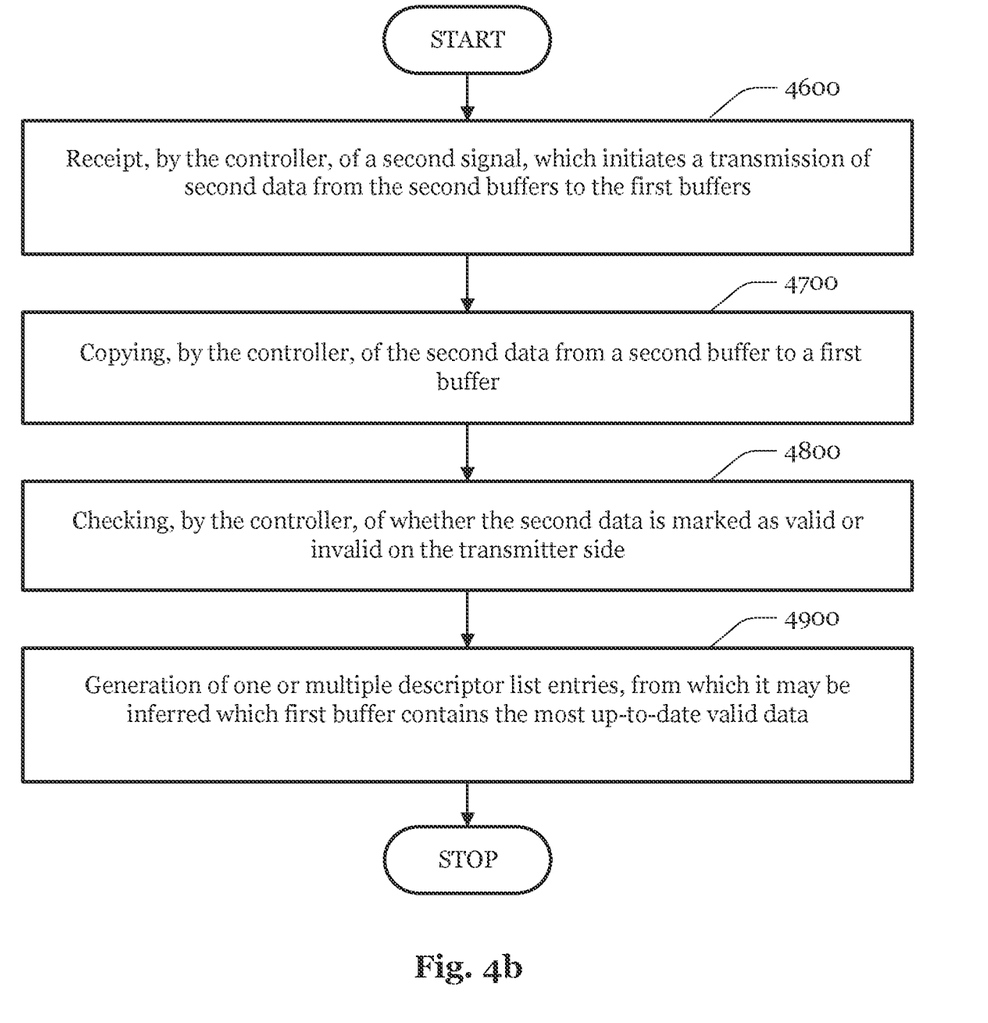
FIG. 4b shows further steps, which illustrate the use of apparatuses according to the invention.

FIG. 4b illustrates the data transmission in the opposite direction. This begins with step 4600, in which a second signal is received by controller 600, which initiates a transmission of second data from receive buffer 840 to first buffers 510, 520, 530. In response to the second signal, the second data is copied in step 4700 from receive buffer 840 to a first buffer 520. In step 4800, a check is then made of whether the second data was marked as valid or invalid on the transmitter side. In step 4900, one or multiple entries are furthermore generated in descriptor list 420, from which it is inferred which of first buffers 510, 520, 530 contains the most up-to-date valid data.

Figure 5A:
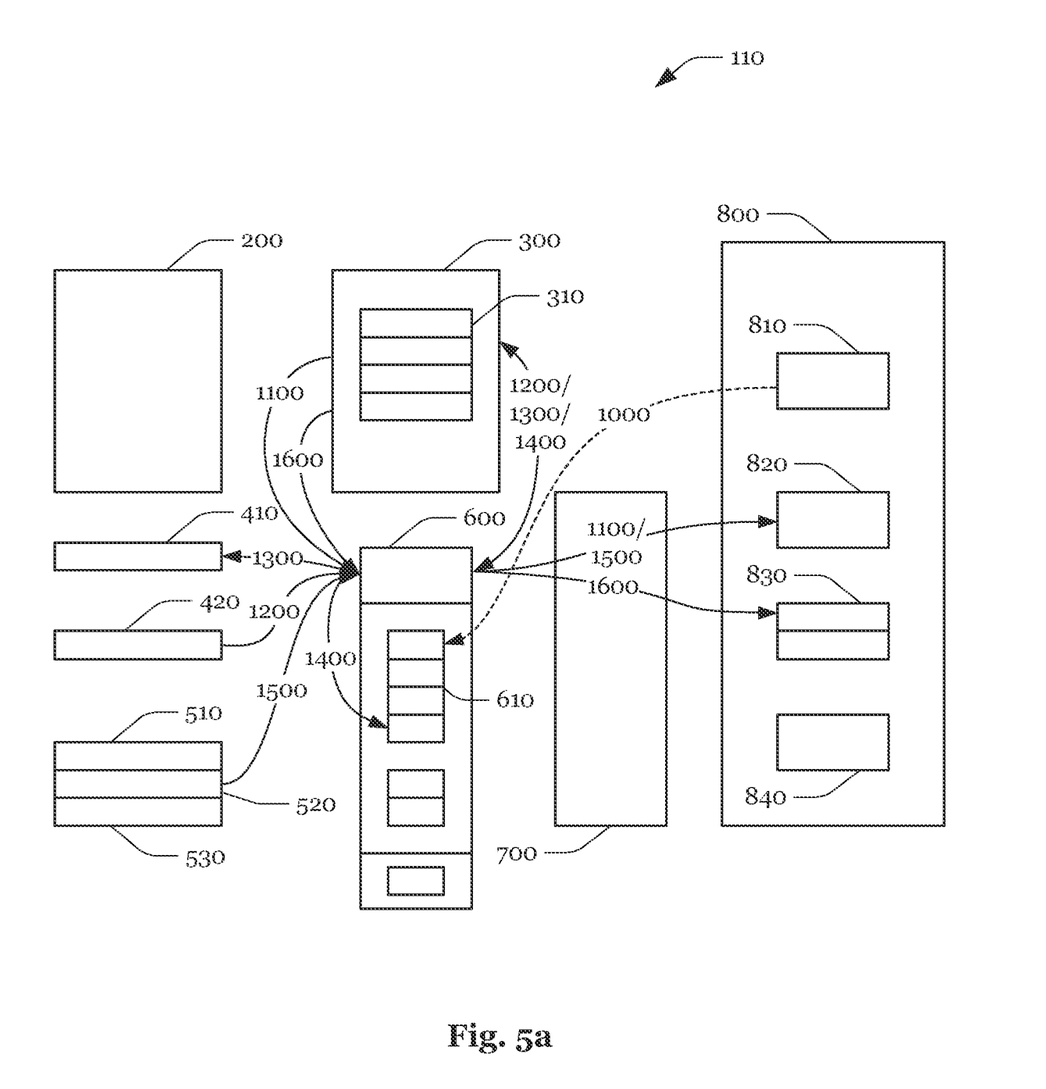
FIG. 5a shows a possible modification of the example illustrated in FIG. 3.

FIG. 5a illustrates the data transmission from head station 110 to local bus 180, based on a head station 110, which is modified in comparison to FIG. 3 and which comprises a memory 300 (for storing, in particular for temporarily storing, data 310) and a bus interface 800 in addition to the components shown in FIG. 3. Bus interface 800 (which may be implemented, for example, as a "field-programmable gate array", FPGA) transmits a trigger signal 1000 at a fixed point in time (the trigger may be implemented entirely in hardware) to controller 600 (which may be designed, for example, as a DMA controller or as an EDMA controller) and thereby starts the transfer of the process data. If necessary, it is possible to copy arbitrary data 1100 (for example, a message header) from memory 300 in front of process data 1500 or to append this data 1100 to process data 1500.

Controller 600 may copy entry 1200 assigned to first buffer 520 in descriptor list 420 to memory 300 (which may be designed, for example, as a "random access memory," RAM) (to avoid a data inconsistency) and to protect first buffer 520, which is to be read from, against external access by copying buffer number 1300 from memory 300 to buffer lock register 410. Controller 600 may then copy buffer address 1400 from memory 300 to a source address field of memory 610 (parameter RAM) and to transmit process data 1500 from buffer 520 to transmit buffer 820. In the case that a multimaster system or a runtime system having multiple tasks is present, the described procedure may be applied to multiple instances of first buffers 510, 520, 530.

If process data 1500 written to transmit buffer 820 is valid, controller 600 may set "valid" bit 1600 in register 300 of bus interface 800. This may be implemented by transferring a constant mask from memory 300 to register 830.

Figure 5B:
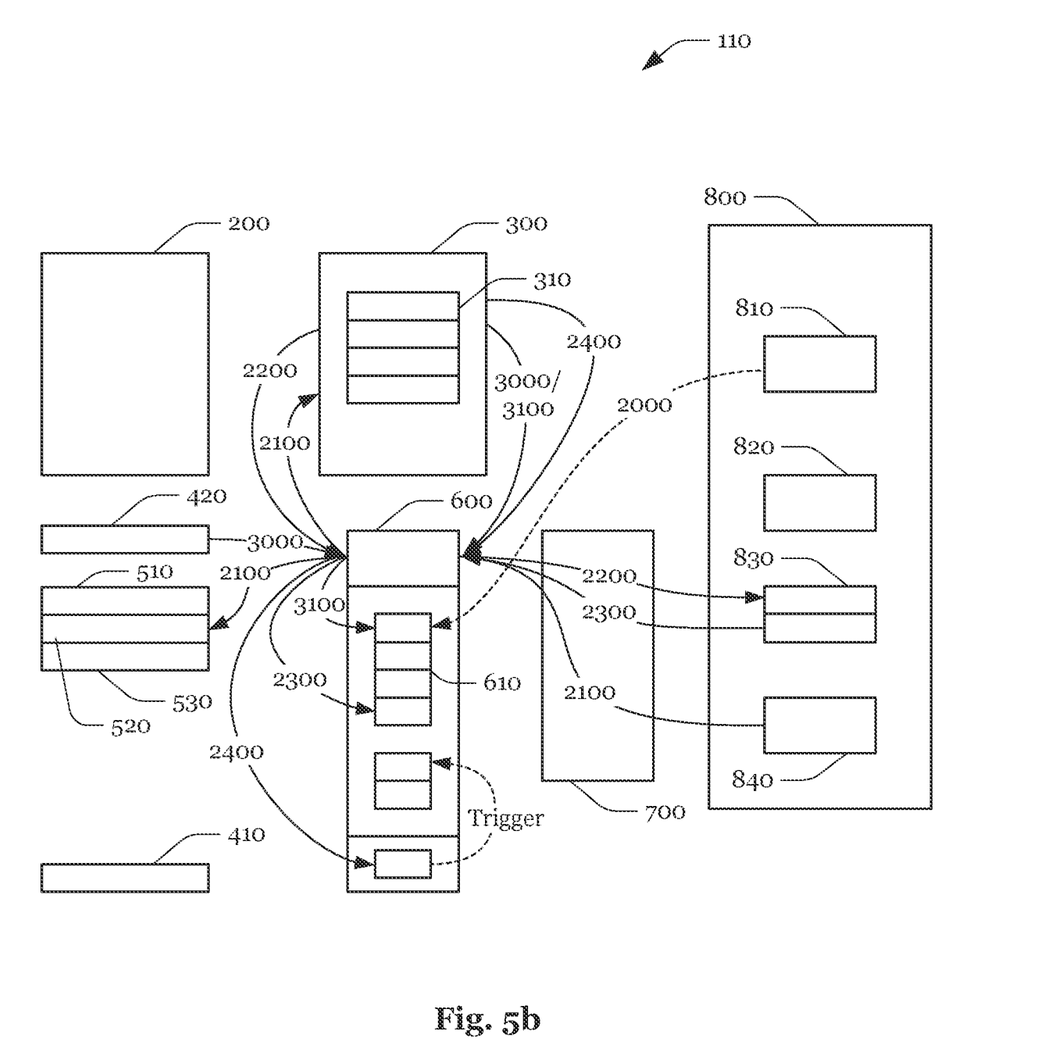

FIG. 5b illustrates the data transmission from local bus 180 to head station 110. Bus interface 800 outputs a trigger signal 2000 to controller 600 at a fixed point in time and starts the data transfer, process data 2100 being transmitted from receive buffer 840 to one of first buffers 510, 520, 530. In the case that a multimaster system or a runtime system having multiple tasks is present, the described procedure may be applied to multiple instances of first buffers 510, 520, 530.

To communicate that the read operation has been completed, controller 600 may set a "complete" bit 2200. This may, in turn, be implemented by transferring a constant mask from memory 300 to register 830. Furthermore, a "valid" bit assigned to process data 2100 may be copied to memory 610 of controller 600 and evaluated. In the case that process data 2100 is invalid, a NULL transfer may be carried out, for example, in which process data 2100 is not copied, and the transmission ends.

If process data 2100 is valid, a mask which triggers the data transfer may be copied from memory 300 to a register of controller 600. The address and number 3000 of first buffer 510, 520, 530, in which process data 2100 are present, may then be copied from memory 300 to descriptor list 420. Starting at this point in time, process data 2100 may be transmitted to further field bus users via field bus 30. A new buffer address 3100 may then be written to memory 610 for the next data transfer.

The data transfer may thus be handled entirely via controller 600, which may carry out not only the copying operation but also a validity check and configure itself, bypassing central processing unit 200. Controller 600 may block buffers 510, 520, 530 used, control transmit and receive buffers 820, 840, check the validity of data 1500, 2100 and select next buffer 510, 520, 530 for subsequent data transfers (self-configuration). Within the scope of the data transfer, no computing time of central processing unit 200 is therefore required, controller 600 may begin the processing chain of the data directly upon the receipt of a trigger signal 1000, 2000, and the data transfer may be implemented in hardware independently of software (which reduces the transmission jitter).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for a buffered transmission of data, the apparatus comprising:
    a central processing unit;
    first buffers;
    second buffers; and
    a controller, wherein in response to a first signal, which initiates a transmission of first data from the first buffers to the second buffers, the controller is configured to:
        ascertain one of the first buffers based on descriptor list entries to provide an ascertained first buffer,
        block the ascertained first buffer against external access,
        store the address of the ascertained first buffer in a parameter memory in the controller,
        copy the first data from the ascertained first buffer to one of the second buffers, and
        mark the first data as valid or invalid after the first data has been copied.

2. The apparatus according to claim 1, wherein the first ascertained buffer contains the most up-to-date valid data.

3. The apparatus according to claim 1, further comprising a temporary storage memory that is provided external of the controller,
    wherein the controller is configured to temporarily store the descriptor list entries in the temporary storage memory prior to the blocking of the ascertained first buffer and to ascertain the one of the first buffers based on the descriptor list entries that are temporarily stored.

4. The apparatus according to claim 1, wherein the controller is configured to prepend a message header to the first data that was copied or to append the message header to the first data that was copied.

5. The apparatus according to claim 1, wherein, in response to a second signal which initiates a transmission of second data from another one of the second buffers to the first buffers, the controller is configured: to copy the second data from the another one of the second buffers to a first buffer, to check, after the copying of the second data, whether the second data is marked as valid or invalid on a transmitter side, and to update at least one of the descriptor list entries from which the controller infers which of the first buffers contains the most up-to-date valid data.

6. The apparatus according to claim 5, wherein the controller is configured to overwrite invalid and/or outdated data in the first buffer upon the copying of the second data.

7. The apparatus according to claim 1, wherein the controller is a direct memory access (DMA) controller or an enhanced direct memory access (EDMA) controller.

8. A method for buffered transmission of data, the method comprising:
- receiving, by a controller, a first signal that initiates a transmission of first data from first buffers to second buffers;
- ascertaining, by the controller, a first buffer based on descriptor list entries to provide an ascertained first buffer;
- blocking, by the controller, the ascertained first buffer against external access;
- storing, by the controller, an address of the ascertained first buffer in a parameter memory in the controller;
- copying, by the controller, the first data from the ascertained first buffer to one of the second buffers; and
- marking the first data copied to the one of the second buffers as valid or invalid.

9. The method according to claim 8, further comprising:
- receiving, by the controller, a second signal which initiates a transmission of second data from the second buffers to the first buffers;
- copying, by the controller, the second data from another one of the second buffers to a first buffer;
- checking, by the controller, whether the second data is marked as valid or invalid on a transmitter side; and
- updating at least one of the descriptor list entries from which the controller infers which of the first buffers contains the most up-to-date valid data.

10. The method according to claim 9, wherein the copying of the first data and the second data is used for a transfer between a field bus and a local bus.

11. The method according to claim 8, further comprising temporarily storing the descriptor list entries in a temporary storage memory prior to the blocking of the ascertained first buffer and ascertaining the one of the first buffers based on the descriptor list entries that are temporarily stored, wherein the temporary storage memory is provided external of the controller.

12. The method according to claim 8, wherein the ascertained first buffer is blocked against external access by the controller by writing the address of the ascertained first buffer to a buffer lock register.

13. The apparatus according to claim 1, wherein the controller is configured to block the ascertained first buffer against external access by writing the address of the ascertained first buffer to a buffer lock register.

* * * * *